United States Patent
VanLund (10) Patent No.: US 9,165,136 B1
(45) Date of Patent: Oct. 20, 2015

(54) SUPERVISING EXECUTION OF UNTRUSTED CODE

(75) Inventor: Peter S. VanLund, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 609 days.

(21) Appl. No.: 12/913,551

(22) Filed: Oct. 27, 2010

(51) Int. Cl.
G06F 21/53 (2013.01)
G06F 21/50 (2013.01)

(52) U.S. Cl.
CPC .............. *G06F 21/53* (2013.01); *G06F 21/50* (2013.01); *G06F 2221/2149* (2013.01)

(58) Field of Classification Search
CPC .............. G06F 21/50–21/54; G06F 2221/2149
USPC ............. 717/127–131; 718/1, 104; 726/1, 22, 726/26, 27, 30
See application file for complete search history.

(56) References Cited

U.S. PATENT DOCUMENTS

| | | | |
|---|---|---|---|
| 6,430,570 B1 * | 8/2002 | Judge et al. | 717/166 |
| 6,918,114 B2 * | 7/2005 | Tapperson | 718/1 |
| 7,631,073 B2 * | 12/2009 | Chagoly et al. | 709/224 |
| 7,725,922 B2 * | 5/2010 | Pouliot | 726/1 |
| 7,925,621 B2 * | 4/2011 | Sikchi et al. | 707/609 |
| 8,312,268 B2 * | 11/2012 | Miyamoto et al. | 713/166 |
| 8,533,778 B1 * | 9/2013 | Dalcher | 726/2 |
| 2004/0255296 A1 * | 12/2004 | Schmidt et al. | 718/100 |
| 2007/0226715 A1 * | 9/2007 | Kimura et al. | 717/148 |
| 2009/0328008 A1 * | 12/2009 | Mital et al. | 717/129 |
| 2010/0064369 A1 * | 3/2010 | Stolfo et al. | 726/24 |

OTHER PUBLICATIONS

Microsoft, "Microsoft Computer Dictionary Fifth Edition", 2002, Microsoft Press, 5th Edition, p. 463.*

* cited by examiner

*Primary Examiner* — Ashok Patel
*Assistant Examiner* — Daniel Potratz
(74) *Attorney, Agent, or Firm* — Thomas | Horstemeyer, LLP (57) ABSTRACT

Disclosed are various embodiments for supervising execution of untrusted code. Untrusted code that is to be executed in a computing device is obtained. A virtual machine in the computing device is configured to execute the untrusted code, with one or more resource access restrictions being placed on the untrusted code. Periodic updates are obtained from the virtual machine relating to one or more resources of the computing device that are consumed by the virtual machine. Execution of the untrusted code in the virtual machine is interrupted in response to a value indicated by one or more of the periodic updates.

23 Claims, 5 Drawing Sheets

SUPERVISING EXECUTION OF UNTRUSTED CODE

BACKGROUND

Administrators of computing infrastructure are often concerned about the effects of user-provided code on system performance and security. It is difficult to write code that does not contain defects. Defects in user-provided code may result in an excessive use of computing resources and/or an unauthorized use of computing resources. Furthermore, user-provided code may, purposely or inadvertently, include malicious code designed to harm a computing system or otherwise use a computing system in an unauthorized way. Consequently, administrators of computing infrastructure may require that user-provided code undergo a comprehensive security evaluation before it can be executed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to supervising execution of untrusted code. Administrators of computing infrastructure are concerned with maintaining the integrity of their systems. To this end, administrators may request that user-provided code be checked for defects and security compliance. However, manual review of code can be time and labor intensive, which may introduce unacceptable delays in deploying the code. Various embodiments of the present disclosure facilitate execution of user-provided code, or other forms of untrusted code, in a supervised environment. In such a supervised environment, resource usage of executing code may be carefully monitored to ensure that the executing code does not consume a disproportionate share of computing resources. Additionally, various system calls and/or other commands may be restricted in the supervised environment for security reasons. In the following discussion, a general description of the system and its components is provided, followed by a discussion of the operation of the same.

Figure 1:
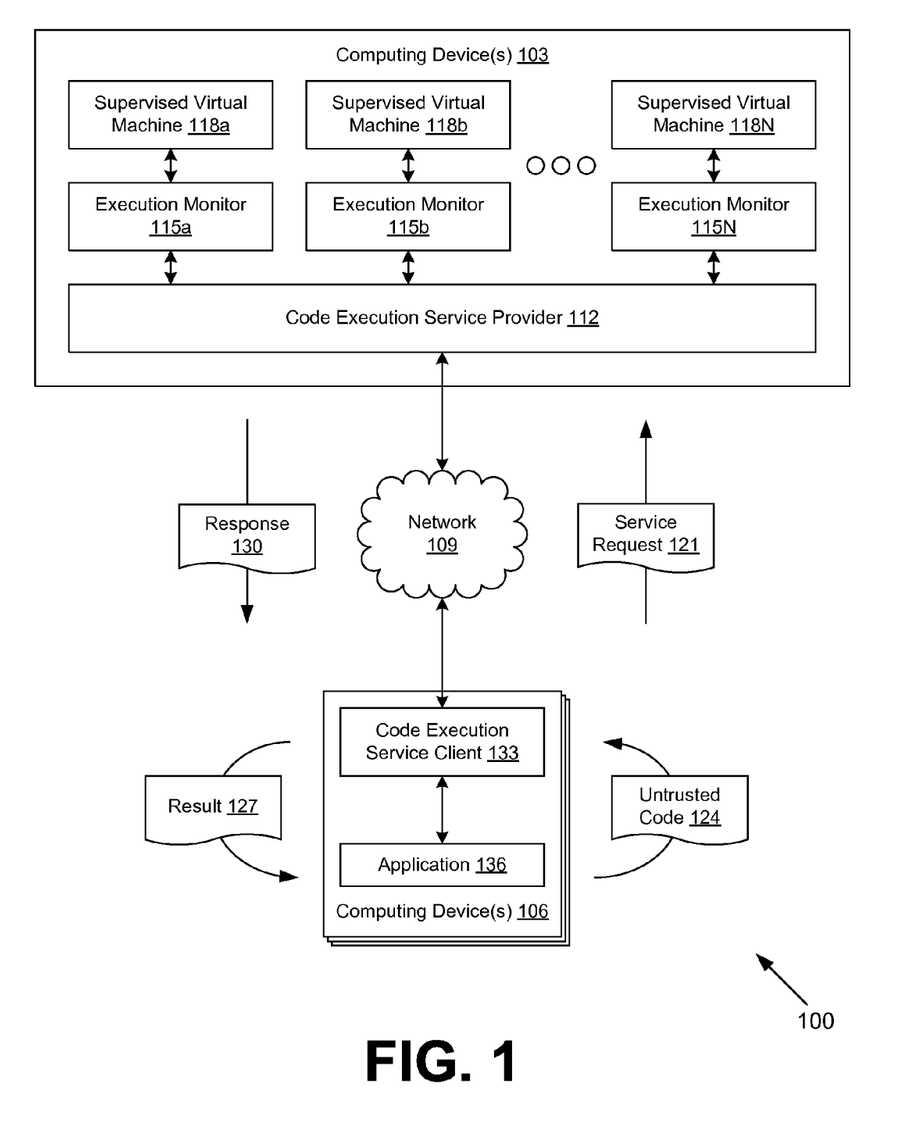
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103, for example, include a code execution service provider 112, a plurality of execution monitors 115, a plurality of supervised virtual machines 118, and other applications, services, processes, systems, engines, or functionality not discussed in detail herein. The code execution service provider 112 is executed to obtain service requests 121 from clients for the execution of untrusted code 124. The untrusted code 124 is executed in the computing device 103 in a supervised virtual machine 118 under the supervision of an execution monitor 115. It is understood that the untrusted code 124 may correspond to any user-provided code for which execution is requested in the computing device 103. The untrusted code 124 may be deemed "untrusted" relative to other code that is executed in the computing device 103, for example, because the untrusted code 124 has not undergone a thorough code review by the administrators of the computing device 103. The code execution service provider 112 is configured to return the result 127 of the execution of the untrusted code 124 to the client within a response 130.

The code execution service provider 112 may correspond to a service provider in a service-oriented architecture. The code execution service provider 112 may communicate with service clients through the use of simple object access protocol (SOAP), hypertext transfer protocol (HTTP), remote method invocation (RMI), remote procedure call (RPC), and/or other network protocols. The service request 121 and response 130 may include, for example, extensible markup language (XML), yet another markup language (YAML), serialized Java objects, and/or other forms of data encoding.

The supervised virtual machines 118 and/or the execution monitors 115 may correspond, for example, to respective instances of Java virtual machines (JVMs). In one embodiment, a parent-child process relationship is established between an execution monitor 115 and a respective supervised virtual machine 118. In various embodiments, the execution monitors 115 and/or the supervised virtual machines 118 may be long-lived processes, such that they continue to execute in memory in anticipation of additional work after execution of a particular application of untrusted code 124 has completed.

The computing device 106 may comprise, for example, a server computer or any other system providing computing capability. In various embodiments, the computing device 106 may be embodied in the form of a desktop computer, a laptop computer, a personal digital assistant, a cellular telephone, a smartphone, a set-top box, a music player, a web pad, a tablet computer system, a game console, an electronic book reader, or other devices with like capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. The components executed on the computing device 106, for example, include a code execution service client 133, an application 136, and other applications, services, processes, systems, engines, or functionality not discussed in detail herein. The code execution service client 133 is executed to obtain requests to execute untrusted code 124 from the application 136 and to submit a service request 121 to the code execution service provider 112 over the network 109. The code execution service client 133 obtains a response 130 from the code execution service provider 112 and sends the result 127 of the execution of the untrusted code 124 onto the application 136. The application 136 may correspond to any application that generates requests for untrusted code 124 to be executed. In one embodiment, the application 136 has a user interface that permits a user to submit a request for the untrusted code 124 to be executed.

Next, a general description of the operation of the various components of the networked environment 100 is provided. To begin, an application 136 submits untrusted code 124 to the code execution service client 133. The untrusted code 124 may correspond to actual code or an identification of code stored in the computing device 103 or 106. The untrusted code 124 may also include various parameters to configure execution of the code.

The code execution service client 133 then submits a service request 121 embodying the untrusted code 124 over the network 109 to the code execution service provider 112. The code execution service provider 112 then provides the code to be executed to one of the execution monitors 115. The execution monitor 115 then configures a supervised virtual machine 118 to execute the code. In one embodiment, the supervised virtual machine 118 may be spawned in response to a request to execute the code. The supervised virtual machine 118 may be launched with default heap size and/or other parameters. Alternatively, the heap size and/or other parameters may be configured based upon the identity of the untrusted code 124 and whether the untrusted code is associated with any penalties. The supervised virtual machine 118 may be configured to enforce one or more system access restrictions to resources of the computing device 103 by the code.

While the code is executing, the supervised virtual machine 118 is configured to send status updates to the execution monitor 115 periodically. These status updates may indicate metrics related to resource consumption, e.g., memory, processor, network 109 bandwidth, etc., by the code and/or the supervised virtual machine 118. The execution monitor 115 may be configured to interrupt or terminate execution of the code based on the values in the status updates. For instance, the code may be stuck in an infinite loop and consuming an unusual amount of processor time. Alternatively, the code may be poorly written and using a large amount of memory. Such resource consumption issues, which may be related to defects in the code, may affect other users of the computing device 103 if execution of the code is not stopped.

If the code is stopped or interrupted, an error result 127 may be returned in a response 130 to the code execution service client 133. Otherwise, if the code completes successfully, a result 127 of the processing may be returned in a response 130. The result 127 may be returned by the code execution service client 133 to the application 136.

In various embodiments, penalties may be associated with untrusted code 124 based on previous executions. As a non-limiting example, an access violation penalty may be associated with the untrusted code 124 when the code attempts an illegal operation. Consequently, subsequent executions of the same untrusted code 124, which could potentially again attempt the illegal operation, may be disallowed. As another non-limiting example, a resource consumption penalty may be associated with the untrusted code 124 when the code uses beyond a threshold amount of processor time, memory, etc. Such a resource consumption penalty may impose tighter limits on resource usage of the untrusted code 124 because the untrusted code 124 is known to be potentially problematic. Thus, thresholds that determine whether untrusted code 124 is misbehaving may be set based in part on the presence of a penalty. Further, if a penalty is currently associated with the untrusted code 124, the penalty may be increased upon additional misbehavior.

By preventing unreasonable resource consumption by untrusted code 124, the system can protect against denial-of-service attacks. The system can also protect against inadvertent unreasonable resource consumption that may lead to performance degradation. As a consequence, the system can abide by service-level agreements that may be established for some users. Where the computing device 103 corresponds to a cloud computing resource, the system may prevent an unnecessary automatic scaling of resources allocated to the execution of code that contains defects.

In some embodiments, the service layer implemented by the code execution service provider 112 and the code execution service client 133 may be absent. In such embodiments, the application 136 may execute directly on the computing device 103 and be configured to launch the execution monitor 115. In a Java-based embodiment, the application 136 may resolve a dependency on the execution monitor 115 by way of a Java archive file (JAR) or other classes available in a class path.

As a non-limiting example, embodiments of the present disclosure may be deployed to perform transformations on documents. The untrusted code 124 may implement a specific transformation. The transformation may be defined using, for example, extensible stylesheet language transformations (XSLT), Contivo transformations, or other transformations. A document comprising, for example, XML, hypertext markup language (HTML), or other languages may be transformed from one format to another. The document may be supplied, for example, as a parameter to the transformation in the untrusted code 124.

Figure 2:
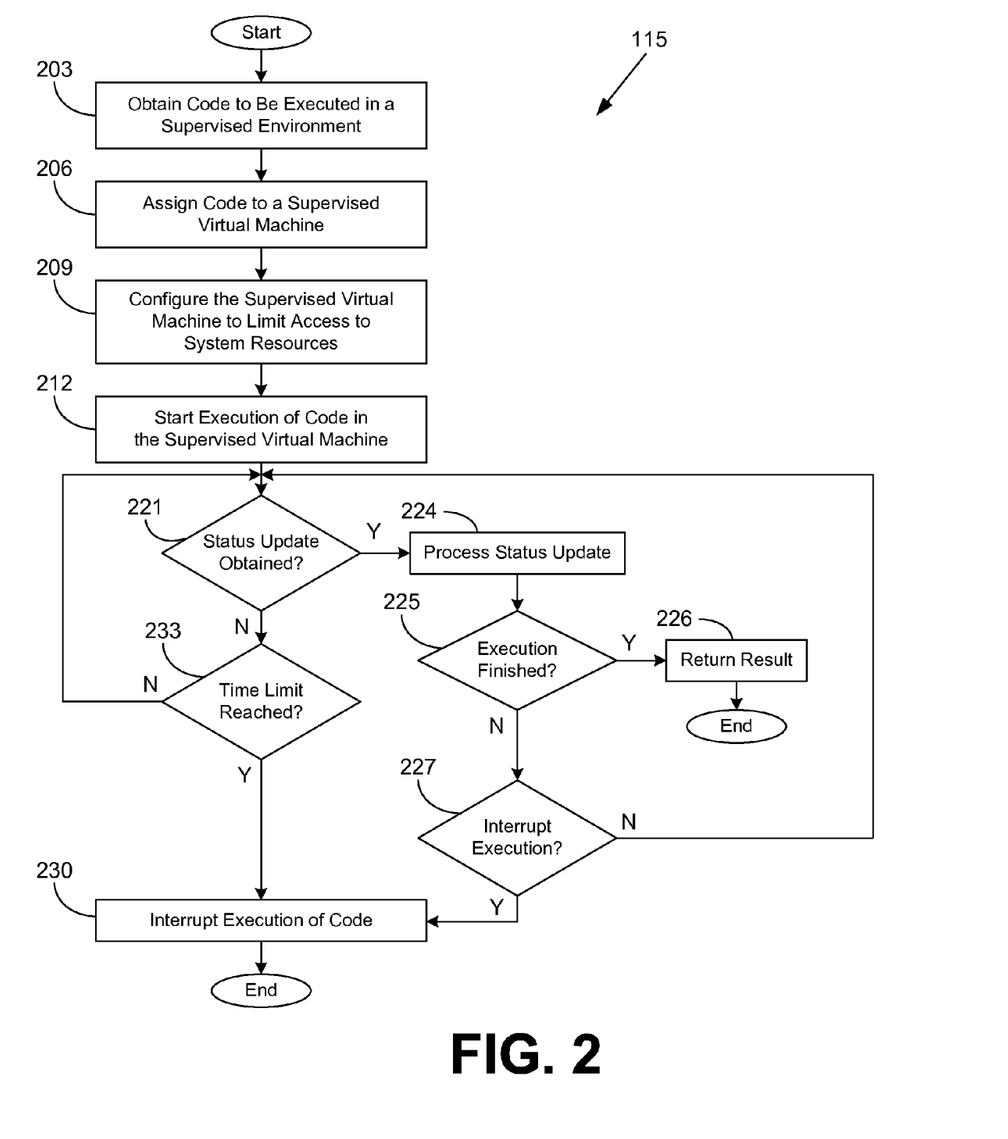
FIGS. 2 and 3 are flowcharts illustrating examples of functionality implemented as portions of an execution monitor executed in a computing device in the networked environment of FIG. 1 according to various embodiments of the present disclosure.

Referring next to FIG. 2, shown is a flowchart that provides one example of the operation of a portion of the execution monitor 115 according to various embodiments. It is understood that the flowchart of FIG. 2 provides merely an example of the many different types of functional arrangements that may be employed to implement the operation of the portion of the execution monitor 115 as described herein. As an alternative, the flowchart of FIG. 2 may be viewed as depicting an example of steps of a method implemented in the computing device 103 (FIG. 1) according to one or more embodiments.

Beginning with box 203, the execution monitor 115 obtains code to be executed in a supervised environment. In one embodiment, the code may currently be available to the execution monitor 115, in which case the execution monitor 115 obtains an indication of the code that is to be executed. The execution monitor 115 may also obtain data relating to parameters for the code. In box 206, the execution monitor 115 assigns the code to a supervised virtual machine 118 (FIG. 1). In one embodiment, the particular supervised virtual machine 118 to which the code is assigned is a child process of the execution monitor 115. The execution monitor 115 may launch a new supervised virtual machine 118 or communicate with an existing supervised virtual machine 118 that is ready to accept new work.

As a non-limiting example, the execution monitor 115 may assign the code to the supervised virtual machine 118 by way of RMI or another form of inter-process communication. Where RMI is used, the execution monitor 115 may, for example, bind a stub of itself to a local RMI registry in the computing device 103. Once a supervised virtual machine 118 is launched by an execution monitor 115, the supervised virtual machine 118 may bind its own stub in the RMI registry. The supervised virtual machine 118 may then look up the corresponding execution monitor 115 in the RMI registry and report back that it is ready to be assigned code.

In box 209, the execution monitor 115 configures the supervised virtual machine 118 to limit access to system resources of the computing device 103 by the code. As a non-limiting example, the execution monitor 115 may configure the supervised virtual machine 118 so that the code cannot use certain system calls or commands, such as "System.exit( )" which exits the supervised virtual machine 118, or other types of commands. As another non-limiting example, the execution monitor 115 may configure the supervised virtual machine 118 to disable writing to a file system in order to prevent untrusted code from filling up the file system or overwriting other files. As yet another non-limiting example, the execution monitor 115 may configure the supervised virtual machine 118 to disable reading from a file system in order to prevent untrusted code from reading protected files. Where the supervised virtual machine 118 corresponds to a Java virtual machine, the supervised virtual machine 118 may be restricted through the use of Java permissions.

In box 212, the execution monitor 115 starts execution of the code in the supervised virtual machine 118. In box 221, the execution monitor 115 determines whether a status update, or "heartbeat," is obtained from the supervised virtual machine 118. The supervised virtual machine 118 may be configured to send such status updates periodically to the execution monitor 115 by way of RMI or another form of inter-process communication. The status updates may relate, for example, to one or more resources of the computing device 103 that are consumed by the code and/or the supervised virtual machine 118. If a status update is obtained, the execution monitor 115 then processes the status update in box 224. An example of processing the status update will be described in connection with the flowchart of FIG. 3.

Based on the result of processing the status update, the execution monitor 115 determines in box 225 whether the execution of the code in the supervised virtual machine 118 has finished. If the execution of the code has finished, the execution monitor 115 moves to box 226 and returns the result, if any, produced by the execution of the code. Thereafter, the portion of the execution monitor 115 ends.

Otherwise, if the execution of the code has not finished, the execution monitor 115 determines in box 227 whether the execution of the code is to be interrupted. For example, the status update may indicate that the code may be stuck within an infinite loop, have a memory leak, or otherwise be inappropriately using resources of the computing device 103. If the execution of the code is to be interrupted, the execution monitor 115 proceeds to box 230 and interrupts the execution of the code. In some embodiments, the supervised virtual machine 118 may be terminated. Thereafter, the portion of the execution monitor 115 ends. If the execution of the code is not to be interrupted after a status update is obtained, the execution monitor 115 instead returns to box 221, where the execution monitor 115 again determines whether a status update has been obtained.

If the execution monitor 115 instead determines in box 221 that no status update is obtained, the execution monitor 115 proceeds to determine whether a time limit has been reached in box 233. For example, if no status update is obtained from the supervised virtual machine 118 within a predetermined time period, the code may have crashed or the supervised virtual machine 118 may not be able to send status updates because of another problem. If a time limit has not been reached, the execution monitor 115 returns to box 221, where the execution monitor 115 again determines whether a status update has been obtained. If a time limit has been reached, the execution monitor 115 instead transitions to box 230 and interrupts the execution of the code. Thereafter, the portion of the execution monitor 115 ends.

Figure 3:
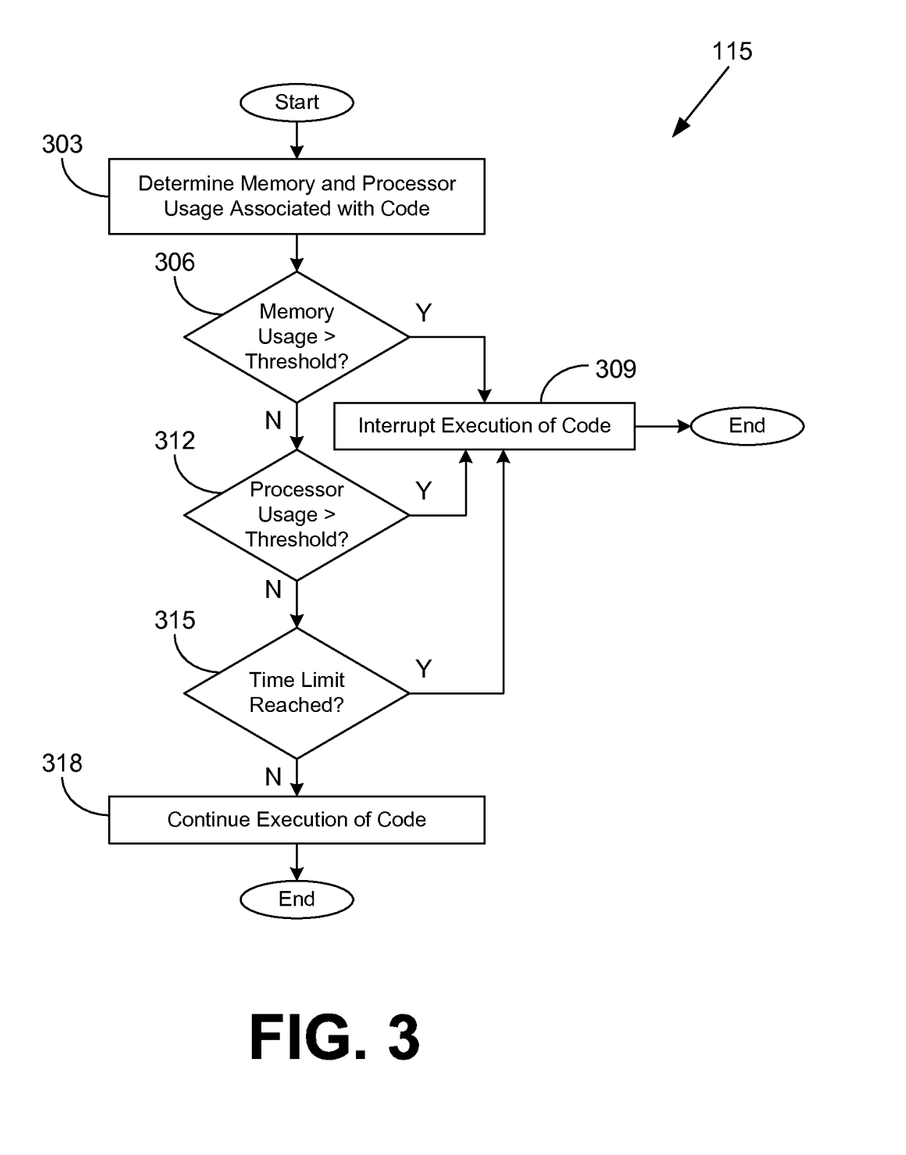

Continuing on to FIG. 3, shown is a flowchart that provides one example of the operation of another portion of the execution monitor 115 according to various embodiments. Specifically, the functionality of FIG. 3 relates to the processing of status updates obtained from a supervised virtual machine 118 (FIG. 1). It is understood that the flowchart of FIG. 3 provides merely an example of the many different types of functional arrangements that may be employed to implement the operation of the portion of the execution monitor 115 as described herein. As an alternative, the flowchart of FIG. 3 may be viewed as depicting an example of steps of a method implemented in the computing device 103 (FIG. 1) according to one or more embodiments.

Beginning with box 303, the execution monitor 115 determines, from a status update, the memory usage and processor usage associated with the code. The usage of other resources, e.g., network resources, etc., of the computing device 103 may also be determined. In box 306, the execution monitor 115 determines whether the memory usage of the code meets or exceeds a threshold for maximum memory usage. If the memory usage does meet or exceed the threshold, the execution monitor 115 interrupts the execution of the code in box 309.

In various embodiments, it may be required that the execution monitor 115 meet or exceed the threshold at least a certain number of times before the code is interrupted. Such a tolerance may be provided, for example, to allow for garbage collection and other activities of the supervised virtual machine 118. As a non-limiting example, the code may be interrupted if the supervised virtual machine 118 uses 95% of the heap size at least three distinct times within a monitoring period. Thereafter, the portion of the execution monitor 115 ends.

If the memory usage does not meet or exceed the threshold, the execution monitor 115 instead continues to box 312 and determines whether the processor usage meets or exceeds a threshold for maximum processor usage. Such a threshold may be defined relative to total processor time used and/or other types of metrics. If the processor usage does meet or exceed the threshold, the execution monitor 115 interrupts the execution of the code in box 309. Thereafter, the portion of the execution monitor 115 ends.

If the processor usage does not meet or exceed the threshold, the execution monitor 115 instead continues to box 315 and determines whether a time limit has been reached for the code to complete execution. As a non-limiting example, a maximum time may be given for completion of the execution of the code. Such a limit may prevent code from taking an inordinate amount of time to complete, e.g., due to "sleeping," etc., while tying up the fixed resources allocated to the supervised virtual machine 118 and the execution monitor 115. If the time limit has been reached, the execution monitor 115 interrupts execution of the code in box 309. Thereafter, the portion of the execution monitor 115 ends.

If the execution monitor 115 instead determines in box 315 that a time limit has not been reached, the execution monitor 115 continues execution of the code in box 318. Thereafter, the portion of the execution monitor 115 ends.

Figure 4:
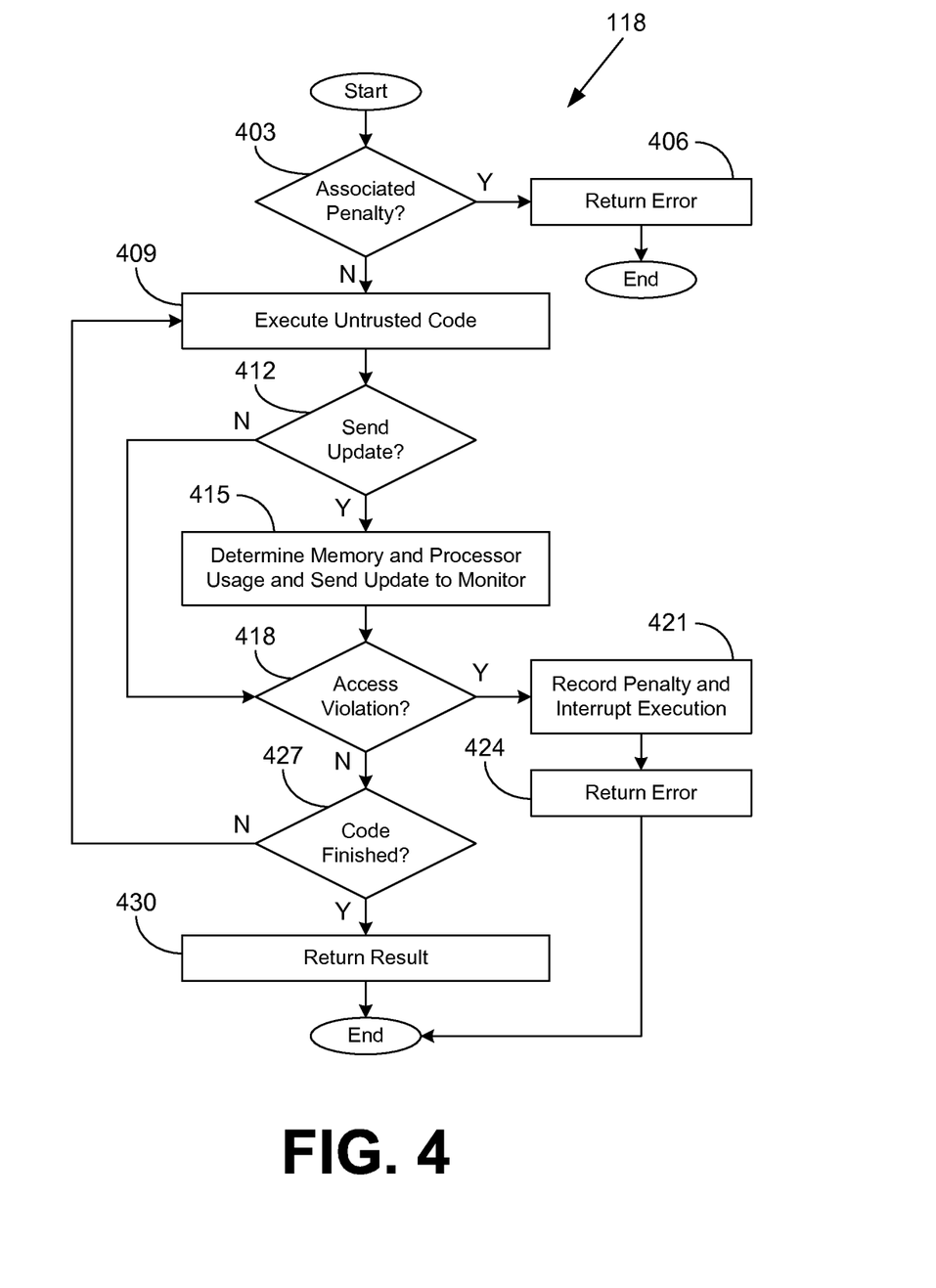
FIG. 4 is a flowchart illustrating one example of functionality implemented as portions of a supervised virtual machine executed in a computing device in the networked environment of FIG. 1 according to various embodiments of the present disclosure.

Turning now to FIG. 4, shown is a flowchart that provides one example of the operation of a portion of the supervised virtual machine 118 according to various embodiments. It is understood that the flowchart of FIG. 4 provides merely an example of the many different types of functional arrangements that may be employed to implement the operation of the portion of the supervised virtual machine 118 as described herein. As an alternative, the flowchart of FIG. 4 may be viewed as depicting an example of steps of a method implemented in the computing device 103 (FIG. 1) according to one or more embodiments.

Beginning with box 403, the supervised virtual machine 118 determines whether the code to be executed is associated with a penalty. As a non-limiting example, the code may be associated with improper system commands, file reads, file writes, etc. that may be serious enough for the system to prevent future execution of the code. As another non-limiting example, the code may be known to enter infinite loops, use a disproportionate share of memory, and/or have other resource consumption issues that may be serious enough for the system to prevent future execution of the code. If the code is associated with such a penalty, the supervised virtual machine 118 returns an error in box 406. Thereafter, the portion of the supervised virtual machine 118 ends.

If the code is not associated with such a penalty, the supervised virtual machine 118 continues to box 409 and executes the untrusted code. In box 412, the supervised virtual machine 118 determines whether an update is to be sent to the corresponding execution monitor 115 (FIG. 1). If an update is to be sent, the supervised virtual machine 118 moves to box 415 and determines memory usage, processor usage, and/or other resource usage. The supervised virtual machine 118 then sends one or more status updates, including the resource usage metrics, to the execution monitor 115. The supervised virtual machine 118 then proceeds to box 418. If the supervised virtual machine 118 is not to send a status update, the supervised virtual machine 118 also proceeds to box 418.

In box 418, the supervised virtual machine 118 determines whether the code has committed an access violation. For example, where the supervised virtual machine 118 is an instance of a Java virtual machine, an exception may be thrown when a policy permission is violated. If the code has committed an access violation, the supervised virtual machine 118 records a penalty and interrupts execution of the code in box 421. In one embodiment, the supervised virtual machine 118 passes an indication of the penalty to the respective execution monitor 115 so that the penalty may be recorded. The supervised virtual machine 118 then returns an error in box 424. Thereafter, the portion of the supervised virtual machine 118 ends.

If the code does not commit an access violation, the supervised virtual machine 118 continues to box 427 and determines whether the code has finished execution. If the code has not finished execution, the supervised virtual machine 118 returns to box 409 and continues execution of the code. If the code has finished execution, the supervised virtual machine 118 returns a result, if applicable, in box 430. Thereafter, the portion of the supervised virtual machine 118 ends.

Figure 5:
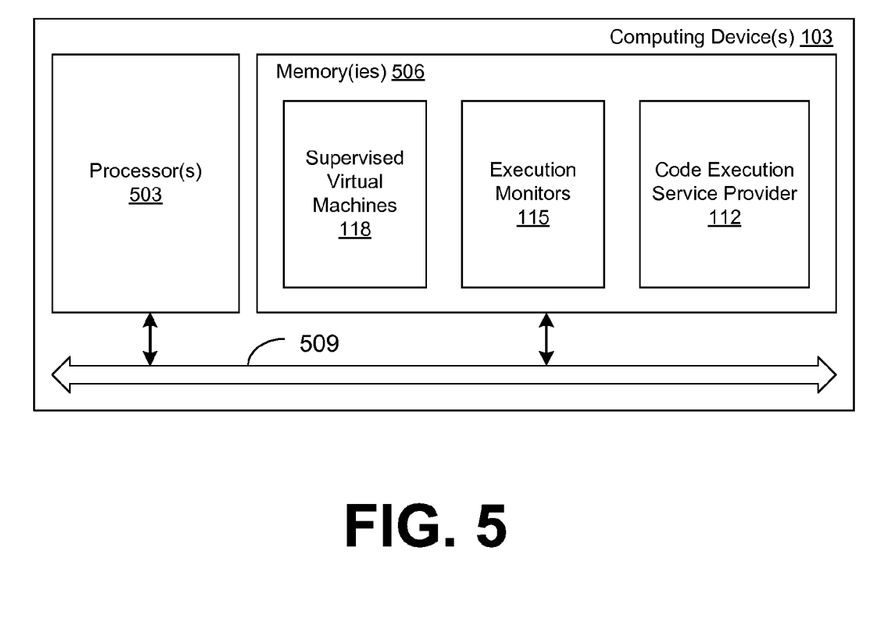
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the supervised virtual machines 118, the execution monitors 115, the code execution service provider 112, and potentially other applications. Also stored in the memory 506 may be a data store and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the supervised virtual machines 118, the execution monitors 115, the code execution service provider 112, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the execution monitor 115 and the supervised virtual machines 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the supervised virtual machines 118, the execution monitors 115, and the code execution service provider 112, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that obtains a request to execute a transformation of a document;
    code that rejects the request when the transformation is associated with an access violation penalty;
    code that configures a virtual machine to execute the transformation of the document, wherein the virtual machine is a child process of the program;
    code that configures the virtual machine to enforce at least one system access restriction on the transformation, the virtual machine being configured to terminate execution of the transformation upon violation of the at least one system access restriction;
    code that associates the transformation with the access violation penalty in response to the virtual machine determining that the transformation has violated the at least one system access restriction;

code that determines a first threshold, a second threshold, and a third threshold based at least in part on a usage penalty associated with the transformation, wherein the code that determines the first threshold, the second threshold, and the third threshold decreases the first threshold, the second threshold, and the third threshold when the usage penalty increases;

code that obtains a periodic update regarding the virtual machine when the transformation is executing, the periodic update indicating a memory usage of the virtual machine, a processor usage of the virtual machine, and an execution time associated with the transformation;

code that interrupts, by the program, execution of the transformation when the memory usage meets the first threshold;

code that interrupts, by the program, execution of the transformation when the processor usage meets the second threshold;

code that interrupts, by the program, execution of the transformation when the execution time associated with the transformation meets the third threshold;

code that increases the usage penalty associated with the transformation when the transformation is interrupted by meeting the first threshold, the second threshold, or the third threshold; and code that returns a result of the transformation.

2. The non-transitory computer-readable medium of claim 1, wherein the document comprises extensible markup language (XML), and the transformation comprises extensible stylesheet language transformations (XSLT).

3. The non-transitory computer-readable medium of claim 1, wherein the transformation transforms the document from a first format into a second format.

4. The non-transitory computer-readable medium of claim 1, wherein the at least one system access restriction limits access to a function that is normally available to code executed in the virtual machine.

5. The non-transitory computer-readable medium of claim 1, further comprising code that interrupts execution of the transformation when the periodic update has not been obtained from the virtual machine within a predetermined time period.

6. The non-transitory computer-readable medium of claim 1, wherein the virtual machine comprises an instance of a Java virtual machine.

7. The non-transitory computer-readable medium of claim 6, wherein the virtual machine is configured to communicate with the program using Java remote method invocation (RMI).

8. The non-transitory computer-readable medium of claim 6, wherein the at least one system access restriction corresponds to a Java permission.

9. A system, comprising:
at least one computing device; and
an execution monitor executable in the at least one computing device, the execution monitor comprising:
logic that obtains untrusted code that is to be executed in the at least one computing device, wherein the untrusted code includes a request to execute a transformation of a document;
logic that rejects the request when the transformation is associated with an access violation penalty;
logic that configures a virtual machine to execute the transformation of the document, the virtual machine being a child process of the execution monitor;
logic that configures the virtual machine to enforce at least one system access restriction on the transformation, the virtual machine being configured to terminate execution of the transformation upon violation of the at least one resource access restriction;
logic that associates the transformation with the access violation penalty in response to the virtual machine determining that the transformation has violated the at least one resource access restriction;
logic that determines a first threshold, a second threshold, and a third threshold based at least in part on a usage penalty associated with the transformation, wherein the logic that determines the first threshold, the second threshold, and the third threshold decreases the first threshold, the second threshold, and the third threshold when the usage penalty increases;
logic that obtains a periodic update regarding the virtual machine when the transformation is executing, the periodic update indicating a memory usage of the virtual machine, a processor usage of the virtual machine, and an execution time associated with the transformation;
logic that interrupts, by the execution monitor, execution of the transformation when the memory usage meets the first threshold;
logic that interrupts, by the execution monitor, execution of the transformation when the processor usage meets the second threshold;
logic that interrupts, by the execution monitor, execution of the transformation when the execution time associated with the transformation meets the third threshold;
logic that increases the usage penalty associated with the transformation when the transformation is interrupted by meeting the first threshold, the second threshold, or the third threshold; and
logic that returns a result of the transformation.

10. The system of claim 9, wherein the transformation transforms the document from a first format into a second format.

11. The system of claim 9, wherein the execution monitor further comprises logic that interrupts execution of the transformation when the memory usage, the processor usage, or execution time meets a predetermined threshold in at least a predetermined number of a plurality of periodic updates.

12. The system of claim 9, wherein the at least one resource access restriction limits access to a file system of the at least one computing device.

13. The system of claim 9, wherein the at least one resource access restriction limits access to a function that is normally available to code executed in the virtual machine.

14. The system of claim 9, wherein the execution monitor further comprises logic that interrupts, by the execution monitor, execution of the transformation when the transformation has executed beyond a predetermined time period.

15. The system of claim 9, wherein the execution monitor further comprises logic that interrupts, by the execution monitor, execution of the transformation when the periodic update has not been obtained from the virtual machine within a predetermined time period.

16. The system of claim 9, wherein the virtual machine comprises an instance of a Java virtual machine.

17. The system of claim 16, wherein the virtual machine is configured to communicate with the execution monitor using Java remote method invocation (RMI).

18. The system of claim 16, wherein the at least one resource access restriction corresponds to a Java permission.

19. The system of claim 9, further comprising:
a code execution service provider executable in the at least one computing device, the code execution service provider comprising:
  logic that obtains a request to execute the untrusted code in the at least one computing device, the request including at least one parameter to be supplied to the untrusted code, the request being obtained from a code execution service client over a network;
  logic that submits the untrusted code and the at least one parameter to one of a plurality of instances of the execution monitor for execution of the untrusted code, the plurality of instances of the execution monitor executing concurrently in the at least one computing device;
  logic that obtains an execution result from the one of the plurality of instances of the execution monitor; and
  logic that returns the execution result to the code execution service client over the network.

20. A method, comprising:
configuring, in at least one computing device, a virtual machine to execute a transformation of a document in response to a request from untrusted code, wherein the virtual machine is a child process of a program external to the virtual machine;
rejecting the request when the transformation is associated with an access violation penalty;
configuring the virtual machine to enforce at least one system access restriction on the transformation, the virtual machine being configured to terminate execution of the transformation upon violation of the at least one system access restriction;
associating, in the at least one computing device, the transformation with the access violation penalty in response to the virtual machine determining that the transformation has violated the at least one system access restriction;
determining a first threshold, a second threshold, and a third threshold based at least in part on a usage penalty associated with the transformation, wherein the program decreases the first threshold, the second threshold, and the third threshold when the usage penalty increases;
obtaining, in the at least one computing device by the program, a periodic update regarding the virtual machine when the transformation is executing, the periodic update indicating a memory usage of the virtual machine, a processor usage of the virtual machine, and an execution time associated with the transformation;
interrupting, by the program, execution of the transformation when the memory usage meets the first threshold;
interrupting, by the program, execution of the transformation when the processor usage meets the second threshold;
interrupting, by the program, execution of the transformation when the execution time associated with the transformation meets the third threshold;
increasing the usage penalty associated with the transformation when the transformation is interrupted by meeting the first threshold, the second threshold, or the third threshold; and
returning a result of the transformation.

21. The method of claim 20, further comprising terminating, in the at least one computing device and by the program external to the virtual machine, execution of the untrusted code when the periodic update has not been obtained within a predetermined time period.

22. The method of claim 20, further comprising determining, in the at least one computing device, the threshold based at least in part on the penalty.

23. The method of claim 20, wherein the at least one system access restriction restricts the untrusted code from exiting the virtual machine.

* * * * *

UNITED STATES PATENT AND TRADEMARK OFFICE
CERTIFICATE OF CORRECTION

| | | |
|---|---|---|
| PATENT NO. | : 9,165,136 B1 | Page 1 of 1 |
| APPLICATION NO. | : 12/913551 | |
| DATED | : October 20, 2015 | |
| INVENTOR(S) | : VanLund | |

It is certified that error appears in the above-identified patent and that said Letters Patent is hereby corrected as shown below:

In The Claims

Column 12, line 5, replace the word "resource" with --system--.

Column 12, line 9, replace the word "resource" with --system--.

Column 12, line 48, replace the word "resource" with --system--.

Column 13, line 2, replace the word "resource" with --system--.

Signed and Sealed this
Twenty-ninth Day of March, 2016

Michelle K. Lee
*Director of the United States Patent and Trademark Office*